(12) United States Patent
Nyu

(10) Patent No.: US 6,385,319 B1
(45) Date of Patent: May 7, 2002

(54) ENCODING CIRCUIT AND METHOD OF DETECTING BLOCK CODE BOUNDARY AND ESTABLISHING SYNCHRONIZATION BETWEEN SCRAMBLER AND DESCRAMBLER

(75) Inventor: Takayuki Nyu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/207,205

(22) Filed: Dec. 8, 1998

(30) Foreign Application Priority Data

Dec. 9, 1997 (JP) ............................... 9-339036

(51) Int. Cl.[7] ................................. H04K 1/06
(52) U.S. Cl. ...................... 380/274; 380/268; 380/261
(58) Field of Search ................... 713/201, 189; 380/255, 33, 270, 268, 274, 261; 375/367, 362

(56) References Cited

U.S. PATENT DOCUMENTS 4,819,231 A * 4/1989 Yamada ..................... 375/367
5,894,517 A * 4/1999 Hutchinson et al. ........ 713/189

* cited by examiner

*Primary Examiner*—Gilberto Barron, Jr.
*Assistant Examiner*—Matthew Smithers
(74) *Attorney, Agent, or Firm*—Sughrue Mion, PLLC

(57) ABSTRACT

The present invention comprises the bus reset detection circuit 6 detecting a bus reset signal from the network initiation/control state machine, the bus reset identification code generation circuit 8 and the bus reset identification code detection circuit 11 detecting a bus reset identification code and the bus reset signal generation circuit 16 which outputs a bus reset signal to the network initiation/control state machine.

9 Claims, 14 Drawing Sheets

FIG.8

| CONTROL SIGNAL CODE | SIGNIFICANCE OF CODE | CONTROL SIGNAL CODE | SIGNIFICANCE OF CODE |
|---|---|---|---|
| 0 0 0 0 | IDLE | 1 0 0 0 | SPEED- |
| 0 0 0 1 | REQUEST/GRANT | 1 0 0 1 | DATA_PREFIX+ |
| 0 0 1 0 | PARENT_NOTIFY | 1 0 1 0 | DATA_END+ |
| 0 0 1 1 | CHILD_NOTIFY | 1 0 1 1 | DATA_END-E |
| 0 1 0 0 | SPEED+ | 1 1 0 0 | ESCAPE |
| 0 1 0 1 | RESET | 1 1 0 1 | reserved |
| 0 1 1 0 | DATA_END- | 1 1 1 0 | reserved |
| 0 1 1 1 | DATA_END+E | 1 1 1 1 | DATA_PREFIX- |

FIG.10

| SCRAMBLER OUTPUT | | 4B/10B CONVERSION OUTPUT | SCRAMBLER OUTPUT | | 4B/10B CONVERSION OUTPUT |
|---|---|---|---|---|---|
| [S',R',Q',P'] | SYMBOL | | [S',R',Q',P'] | SYMBOL | |
| 0 0 0 0 | C 0 | 0 0 0 0 0 1 1 1 1 1 | 1 0 0 0 | C 8 | 0 1 1 1 1 1 0 0 0 0 |
| 0 0 0 1 | C 1 | 0 0 0 0 1 0 1 1 1 1 | 1 0 0 1 | C 9 | 1 0 1 1 1 1 0 0 0 0 |
| 0 0 1 0 | C 2 | 0 0 0 0 1 1 1 1 1 0 | 1 0 1 0 | C 10 | 0 0 1 1 1 1 1 0 0 0 |
| 0 0 1 1 | C 3 | 0 0 0 1 0 0 1 1 1 1 | 1 0 1 1 | C 11 | 1 1 0 1 1 1 0 0 0 0 |
| 0 1 0 0 | C 4 | 0 0 1 0 0 0 1 1 1 1 | 1 1 0 0 | C 12 | 1 1 1 0 1 1 0 0 0 0 |
| 0 1 0 1 | C 5 | 1 1 0 0 0 0 1 1 1 1 | 1 1 0 1 | C 13 | 1 1 1 1 0 0 0 0 0 1 |
| 0 1 1 0 | C 6 | 0 1 0 0 0 0 1 1 1 1 | 1 1 1 0 | C 14 | 1 1 1 1 0 1 0 0 0 0 |
| 0 1 1 1 | C 7 | 1 0 0 0 0 0 1 1 1 1 | 1 1 1 1 | C 15 | 1 1 1 1 1 0 0 0 0 0 |

FIG.12
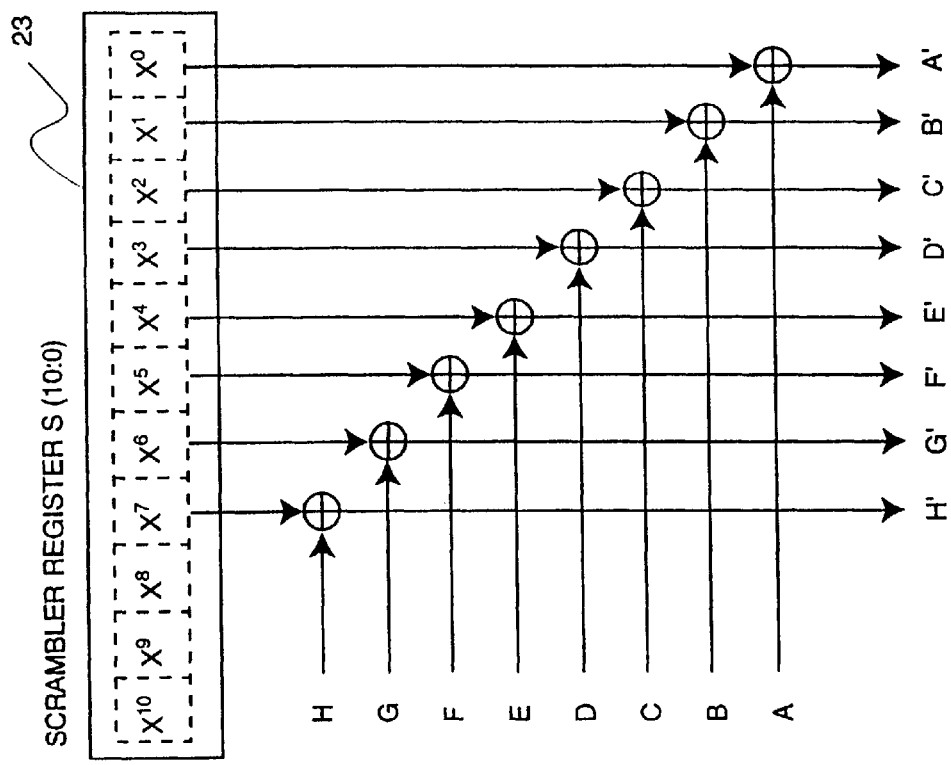
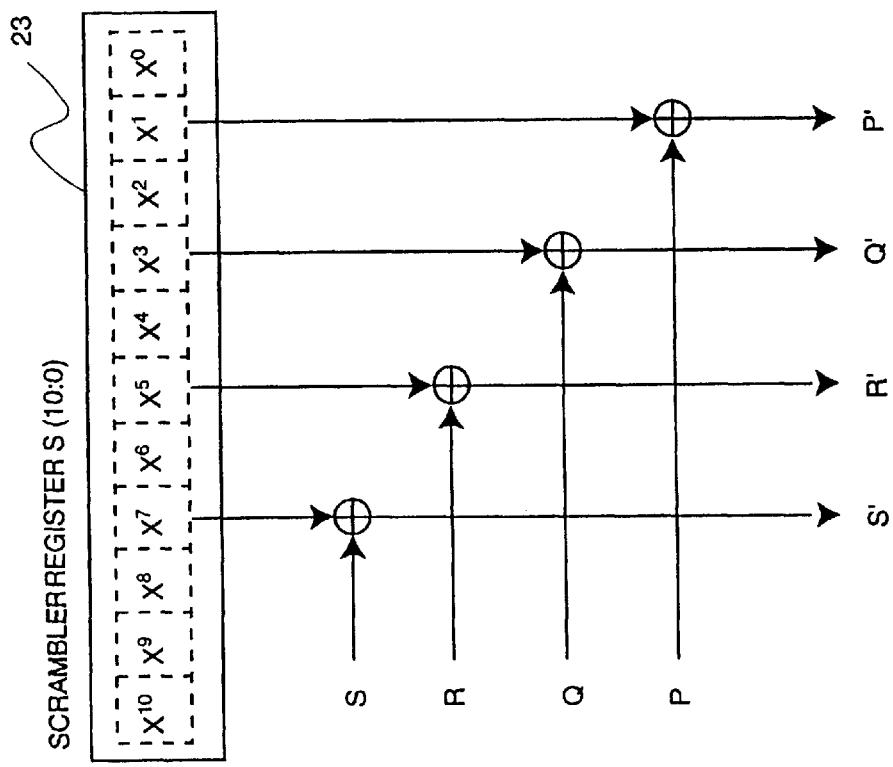

FIG 14

| CLK | SCRAMBLER REGISTER S(10:0) | SCRAMBLER OUTPUT [S',R',Q',P'] | SYMBOL | DESCRAMBLER REGISTER D(10:0) | DESCRAMBLER OUTPUT [S",R",Q",P"] |
|---|---|---|---|---|---|
| 0 | 10000000000 | 0001 | c1 | 01001011111 | 0010 |
| 1 | 00010000000 | 1001 | c9 | 11101100001 | 1101 |
| 2 | 00001010000 | 0001 | c1 | 00100001100 | 0011 |
| 3 | 00000100010 | 0100 | c4 | 10010100010 | 1001 |
| 4 | 01000010101 | 0001 | c1 | 01010010101 | 1001 |
| 5 | 10101001000 | 0011 | c3 | 10101001000 | 0001 |
| 6 | 00000011101 | 0011 | c3 | 00000001101 | 0001 |
| 7 | 10100000111 | 0000 | c0 | 10100000111 | 0001 |
| 8 | 11100100011 | 0100 | c4 | 11100100011 | 0001 |
| 9 | 01101110101 | 0101 | c5 | 01101110101 | 0001 |
| 10 | 10111010100 | 1001 | c9 | 10111010100 | 0001 |
| 11 | 10001010000 | 0001 | c1 | 10001010000 | 0001 |
| 12 | 00010100010 | 1100 | c12 | 00010100010 | 0001 |

ENCODING CIRCUIT AND METHOD OF DETECTING BLOCK CODE BOUNDARY AND ESTABLISHING SYNCHRONIZATION BETWEEN SCRAMBLER AND DESCRAMBLER

BACKGROUND OF THE INVENTION

The present invention relates to an encoding circuit used in a serial bus (for example, a serial bus standardized by the Institute of Electrical and Electronics Engineers [IEEE] Standard for a High Performance Serial Bus—the IEEE Std 1394-1995-, hereafter called a 1394) connectable to a personal computer (hereafter, a PC) and electronic devices.

A network using a 1394 for the purpose of transmitting a control signal and a main signal between a PC and peripheral devices such as a printer, a hard disk, a scanner and the like, or between a PC and an AV (Audio Visual) electronic device (hereafter, call a 1394-equipped terminal device a node) is supposed.

A node has a port (hereafter, called a DS port) using an encoding method of transmitting a data signal and a strobe signal at the same time, which is called a DS-Link encoding method (making reference to the IEEE Std. 1394-1995 pp.34). The DS-Link encoding method has a characteristic that a clock can be regenerated by generating an exclusive OR of two (2) signals on the receiving side on the one hand, but it has also a defect, on the other hand, that a transmitting signal transmitted from a transmitting node can not be regenerated precisely on the receiving side in the case where a phase difference between two signals is generated on the receiving side due to a difference between propagating speeds of the two signals because two signals are transmitted at the same time and in the case where a distance between nodes becomes long. Therefore, a distance between nodes is limited within several meters in the case where a DS-Link encoding method is used.

On the other hand, in the case where a distance between nodes extends over for scores of meters, a node has a port (hereafter, called a serial port) having an encoding circuit for the purpose of performing a serial transmission. However, in this case, it is necessary to regenerate a clock out of a transmission signal using a clock recovery circuit on the receiving side.

In FIG. 6, a constitution of nodes having DS ports and serial ports are shown. The port (a)s, (b)s are DS ports, and the port (c)s is serial ports. The present invention relates to a serial port, description about a DS port is omitted (making reference to the IEEE 1394-1995 pp. 76 in detail). As for the node A and the node B, serial ports are connected to each other by way of a transmission path. Each node has the network initiation/control state machine 21 performing the acquisition of the transmission right to the network at the time of the initiation of the network and during the usual operation. A serial port is composed of the transmitting block 18, the receiving block 19 and thee port initiation block 20.

The transmitting block 18 transmits a control signal outputted from the port initiation block 20 until the initiation of the port is completed. After the completion of the initiation of the port, the transmitting block 18 transmits a control signal outputted from the network initiation/control state machine.

The receiving block 19 passes a received control signal to the port initiation block 20 until the initiation of the port is completed. The receiving block 19 passes a control signal to the network initiation/control state machine after the completion of the initiation of the port.

The port initiation block 20 acknowledges that ports were connected to each other using a Port_Status signal at the time when the initiation of the ports was completed and a communication connecting the ports to each other could be available to the upper network initiation/control state machine 21. The network initiation/control state machine 21 which has detected a change of a Port_Status signal starts the initiation of the network by transmitting a bus reset signal. The present invention relates to a serial port., description about the initiation of the network is omitted (making reference to the IEEE 1394-1995 pp. 98–112 in detail).

The operation procedure of the port initiation block 20 is shown in FIG. 7. The transmitting block operates at S100 (baud rate 125 Mb/s) of the lowest transmitting speed at the initiation of the ports. Until an output clock of a PLL (Phase Locked Loop) circuit generating a transmitting clock is stabilized (locked) at 125 MHz after the power of the nodes is switched on, since the transmitting block remains in a state of resetting, there is no output from the port. Once an output of the transmitting PLL is stabilized, the port initiation block 20 outputs a Request/Grant code (0001) in series as a control signal. A list of control signal codes is shown in FIG. 8. A opposed node also operates in the similar procedure, receives a Request/Grant code from the other opposed node. Upon receiving a Request/Grant code, in the receiving block, a clock recovery circuit generating a receiving clock out of a received signal starts to retract a signal, and waits for being capable of stably generating (locking) a receiving clock. After a clock recovery circuit is locked, detecting a boundary of a block code out of a signal serial-transmitted is performed. After the detection of a boundary of a block code, the synchronization between a scrambler which is located in the receiving block of the opposed node and a descrambler (for example, in FIG. 6, the scrambler of the node A and the descrambler of the node B, or the scrambler of the node B and the descrambler of the node A) is obtained. After the establishment of the synchronization between a scrambler and a descrambler, an IDLE code (0000) is outputted as a control signal from the port initiation block. The node which has detected an IDLE code recognizes that a clock recovery circuit of the opposed node being locked, the detection of a block code boundary and the establishment of the synchronization between a scrambler and a descrambler are completed.

Next, in order to arbitrate a transmitting speed between ports, the port initiation block 20 outputs a SPEED code indicating the maximum transmitting speed that its port can transmit as a control signal. After receiving a SPEED code from the opposed node, the port initiation block 20 compares the SPEED code from the opposed node with the SPEED code transmitted by itself, and sets a transmitting speed of the ports at the lower transmitting speed. At that time, in the case where the transmitting speed is set at S100 (a plurality of transmitting speeds are standardized by the IEEE 1394, the lowest transmitting speed is defined as S100:100 Mb/s. Besides this, S200: 200 Mb/s, S400:400 Mb/s and the others are standardized.), a Port_Status signal is set in order to acknowledge the completion of the initiation of the port to the upper network initiation/control state machine. In the case where the transmitting speed is not set at S100, a speed arbitration flag indicating the completion of the arbitration of a transmitting speed is set, and after a transmitting PLL circuit and a clock recovery circuit are reset, the procedure of the initiation of the port is performed again. After the completion of the steps up to the establishment of the synchronization between a scrambler and a descrambler, a Port_Status signal is set, then, the initiation of the port is completed.

For example, if the maximum transmitting ability of the node A is S100 and the maximum transmitting ability of the node B is S200, the node A transmits a code indicating that the maximum speed of the node A is S100, the node B transmits a code indicating that the maximum speed of the node B is S200. In the node B, as a SPEED code received from the node A is recognized, a transmitting speed of the serial port of the node B is set at S100. Since both the node A and the node B already operates at S100, the operations of the node A and the node B subsequently transfer to the usual operations. On the other hand, in the case where the maximum transmitting speed is set at S200 in both the node A and the node B, a transmitting speed of the serial port of both the node A and the node B is set at S200. After that, in order to make the PLL circuit and the clock recovery circuit operate at S200, the procedure of the initiation is performed again at S200, and after the completion of the operations up to a step of the establishment of the synchronization between a scrambler and a descrambler, the operations of the node A and the node B transfer to the usual operations.

Next, the operation of the transmitting block and the receiving block at the time of the initiation of the port will be described below. Constitutions of the transmitting block 18 and the receiving block 19 are shown in FIG. 9. In the transmitting block 18, a control signal and a main signal is switched by the selector A1, and codes are randomized by the scrambler 2. As for randomized codes, a control signal is converted into a block code of 10 bits by the 4B/10B conversion circuit 3, and a main signal is converted into a block code of 10 bits by the 8B/10B conversion circuit 3. It should be noted that a list of conversion of the 4B/10B conversion circuit 7 is shown in FIG. 10 (as for 8B/10B conversion table, making reference to P1394b Draft0.05 pp.68–70). A control signal and a main signal which are switched by the selector C are passed to the parallel/serial conversion circuit. After a block code is converted into a serial signal by the parallel/serial conversion circuit 5, and the serial signal is transmitted.

In the receiving block 19, a received serial signal is converted into a parallel signal by the serial/parallel conversion circuit 10, the detection of a block code is performed by detecting the coincidence of a pattern of 10 bits with a symbol C4 (=0010001111) or a symbol C11 (=1101110000) using the block code boundary detection circuit 12. After that, a main signal is converted by the 10B/8B conversion circuit, and a control signal is converted by the 10B/4B conversion circuit, the original control signal or the original main signal are restored by the descrambler.

The block code boundary detection circuit performs the detection of a block code boundary by detecting the coincidence with a C4 and a C11 at the time of the initiation of the port. Since the same pattern with those of a C4 and a C11 exists in a main signal, the detection of a boundary is not performed not so as to perform an erroneous detection during the usual operation.

A scrambler is constituted using a generating polynomial G (x)=$X^{11}+X^9+1$ as shown in FIG. 11, and a pseudo-randomized signal is outputted as a coefficient of $X^7$. Control signals (S R Q P) and main signals (H G F E D C B A) are randomized by their assuming exclusive ORs with coefficents of a scrambler register as shown in FIG. 12. At this time the value of the scrambler register S(10:0) is calculated by an equation of $S_{k+1}(10:0)=T \cdot S_k(10:0)$. Here, k expresses a clock, the value of register $S_{k+1}(10:0)$ is calculated by the product of the foregoing value $S_k(10:0)$ and T. T is expressed by the following expression.

$$T = \begin{matrix} 0 & 0 & 0 & 0 & 0 & 0 & 0 & 0 & 1 & 0 & 0 \\ 0 & 0 & 0 & 0 & 0 & 0 & 0 & 0 & 0 & 1 & 0 \\ 0 & 0 & 0 & 0 & 0 & 0 & 0 & 0 & 0 & 0 & 1 \\ 1 & 0 & 1 & 0 & 0 & 0 & 0 & 0 & 0 & 0 & 0 \\ 0 & 1 & 0 & 1 & 0 & 0 & 0 & 0 & 0 & 0 & 0 \\ 0 & 0 & 1 & 0 & 1 & 0 & 0 & 0 & 0 & 0 & 0 \\ 0 & 0 & 0 & 1 & 0 & 1 & 0 & 0 & 0 & 0 & 0 \\ 0 & 0 & 0 & 0 & 1 & 0 & 1 & 0 & 0 & 0 & 0 \\ 0 & 0 & 0 & 0 & 0 & 1 & 0 & 1 & 0 & 0 & 0 \\ 0 & 0 & 0 & 0 & 0 & 0 & 1 & 0 & 1 & 0 & 0 \\ 0 & 0 & 0 & 0 & 0 & 0 & 0 & 1 & 0 & 1 & 0 \end{matrix} \quad \text{[EXPRESSION 1]}$$

The establishing procedure of the synchronization between the scrambler register 23 and the descrambler register will be described below with reference to FIG. 13. The scrambler and the descrambler use the same signals as for a control signal and a main signal, the operation of establishing the synchronization between the scrambler and the descrambler is performed at the time of transmitting a control signal. In the case of being for synchronization between the scrambler and the descrambler, a train bit for adjusting the value of the descrambler register is set in the descrambler 15. In this case, the value of the descrambler register D(10:0) is expressed by the expression of $D_{k+1}(10:0)=T \cdot D_k(10:0)+C$. Here, C is expressed using a descrambler output S", Q" and a train bit by the expression of C=[0,0,0,0,S" and train,0,S" and train,0,Q" and train,0,Q" and train]$^t$. At the time of the initiation of the port, at first, a Request/Grant(S R Q P)=(0001) is inputted as a control signal, a train bit is set. Of this case, the variations of the values of a scrambler and a descrambler and descrambler outputs are shown in FIG. 14. At the time of CKL=0, for example, since the value of scrambler register is (10000000000) and the value of descrambler is (01001011111), suppose that the synchronization between the scrambler and the descrambler is not established. Therefore, the descrambler output (S" R" Q" P") is (0010), and this code is different from the inputted control signal (0001). Since a train bit is set and adjustments for descrambler register are added, the value of the descrambler are adjusted as CLK proceeds. At the time of CLK=5, the synchronization between a scrambler and a descrambler is established, both of register values is (10101001000), a descrambler output which is the same with an inputted code (0001) is obtained. Hereafter, as far as the same control signal being inputted, even in a state of a train bit being set, the synchronization is not lost. But in the case where the control signal is changed, the synchronization is lost, therefore, before the control signal is changed, a train bit is reset. Consequently, at the time of the completion of the initiation of port, a train bit was previously reset.

However, even after the completion of the initiation of the port, since an error of a block boundary and loss of the synchronization between the scrambler and the descrambler due to the noises and the like may be generated, it is necessary to perform the detection of a block code boundary, setting of a train bit and the reestablishment of the synchronization between a scrambler and a descrambler even after the completion of the initiation of the port. In the prior art, codes are randomized on the transmitting side, in the case where an error of a block boundary and loss of the synchronization between a scrambler and a descrambler are generated, since a code of the transmitting side can not be recognized on the receiving side, an error of a block boundary and loss of the synchronization can not be detected. Therefore, a timing of performing the re-detection of a block boundary and the re-establishment of the synchronization between a scrambler and a descrambler after the completion of the initiation of the port is ambiguous.

Moreover, in the case where an error of a block boundary and loss of the synchronization between a scrambler and a descrambler are generated, even if they can be detected, performing the procedure of the initiation of the port again means that changes (set/reset and reset/set) of a Port_Status signal are generated two times until the usual operation is restored. Specifically, it is not efficient since the initiation of the network and the arbitration of the transmitting speed must be performed two times.

SUMMARY OF THE INVENTION

It is an objective of the present invention to solve the problems described above.

Moreover, the objective of the present invention is to provide a technology of an encoding circuit for the purpose of performing the re-detection of a block code boundary and the re-establishment of the synchronization between a scrambler and a descrambler without performing the procedure of initiation of the port in the case where an error of a block code boundary and loss of the synchronization between a scrambler and a descrambler are generated due to the noises and the like during the usual operation.

An encoding circuit of the present invention for achieving the objective described above is characterized in that it comprises a bus reset detection circuit (reference numeral 6 of FIG. 1) detecting a control signal outputted from the network initiation/control state machine is a bus reset signal which performs the initiation of the network, a bus reset identification code generation circuit (reference numeral 8 of FIG. 1) generating a bus reset identification code for replacing a code of a first several clocks interval of a continuous bus reset signal, and still more for detecting a bus reset and a block code boundary on the receiving side, a bus reset identification code detection circuit (reference numeral 11 of FIG. 1) detecting a bus reset identification code and setting a train bit of a descrambler and a bus reset signal generation circuit (reference numeral 16 of FIG. 1) outputting a pseudo bus reset signal to the network initiation/control state machine during the re-establishment of the synchronization of a descrambler.

An encoding circuit of the present invention is characterized in that it comprises a bus reset detection circuit (reference numeral 6 of FIG. 5) detecting a control signal outputted from the network initiation/control state machine is a bus reset signal which performs the initiation of the network and generating a trigger signal which performs re-detection of block code boundary, a block code boundary detection circuit (reference numeral 12 of FIG. 5) setting a train bit after the re-detection of block code boundary and a bus reset signal generation circuit (reference numeral 16 of FIG. 5) outputting a pseudo bus reset signal to the network initation/control state machine during the re-establishment of the synchronization of the descrambler.

According to the present invention as described above, the re-detection of a block code boundary and the re-establishment of the synchronization between a scrambler and a descrambler can be performed, and by an acknowledgment that a bus reset is outputted from the transmitting side using a signal which is not randomized to the receiving side, the initiation of the network and the initiation of the serial port can be performed at the same time using a bus reset signal performing the initiation of the network.

BRIEF DESCRIPTION OF THE DRAWINGS

This and other objectives, features and advantages of the present invention will become more apparent upon a reading of the following detailed description and drawings, in which:

FIG. 8 is a list showing control signal codes and their significance;

FIG. 10 is a list of conversion describing an operation of 4B/10B conversion;

FIG. 12 is a diagram showing the relationship (operation of scrambler) between a scrambler register and a main code or between a scrambler and a control code;

FIG. 14 is a list describing an example of an operation of a descrambler.

DESCRIPTION OF THE EMBODIMENTS

Next, the embodiments of the present invention will be described with reference to the drawings.

Figure 1:
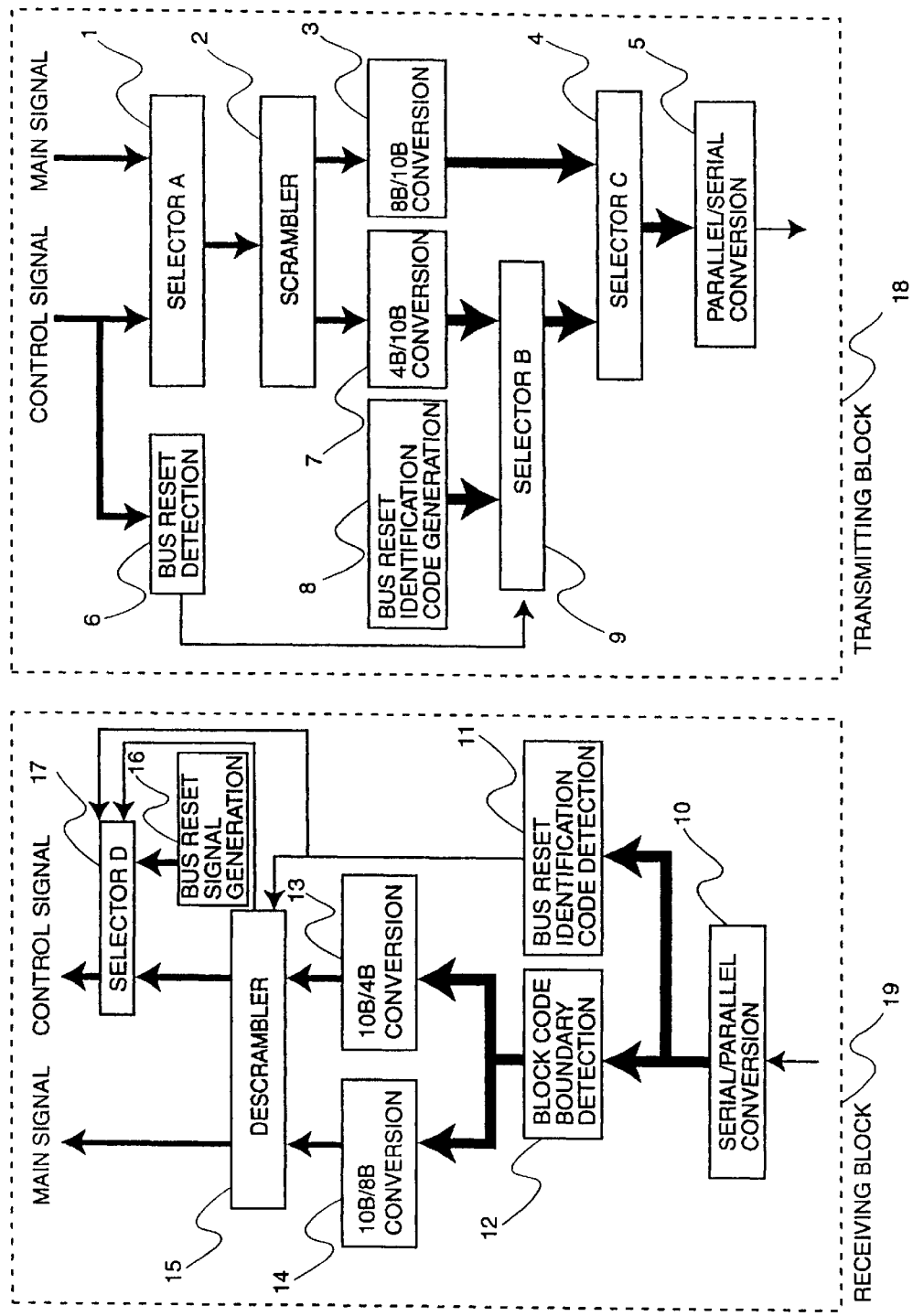
FIG. 1 is a block diagram showing an encoding circuit of the first embodiment of the present invention.

FIG. 1 is a block diagram showing an encoding circuit of the first embodiment of the present invention.

In FIG. 1, an encoding circuit is broadly divided into two (2) sections, the transmitting block 18 and the receiving block 19. The transmitting block 18 is composed of the selector A1, the scrambler 2, the 8B/10B conversion circuit 3, the 4B/10B conversion circuit 7, the selector C4, the parallel/serial conversion circuit 5, the bus reset detection circuit 6, the bus reset identification code generation circuit 8 and the selector B9. On the other hand, the receiving block 19 is composed of the serial/parallel conversion circuit 10, the block code boundary detection circuit 12, the 10B/8B conversion circuit 14, the 10B/4B conversion circuit 13, the descrambler 15, the bus reset identification code detection circuit 11, the bus reset signal generation circuit 16 and the selector D17.

The selector A1 has a function of switching back and forth between a control signal and a main signal for the purpose of using a common scrambler by a control signal and a main signal.

The scrambler 2 has a function of randomizing a data sequence of control signals or main signals.

The 8B/10B conversion circuit 3 has a function of converting a main signal of 8 bits into a code of 10 bits.

The 4B/10B conversion circuit 7 has a function of converting a control signal of 4 bits into a code of 10 bits.

The bus reset detection circuit 6 has functions of detecting a bus reset signal in a control signal and outputting a signal of the purpose of switching the selector B9.

The bus reset identification code generation circuit 8 has a function of generating a special code which is not used in a control signal and a main signal used for the purpose of detecting a bus reset signal on the receiving side.

The selector B9 has functions of usually outputting a signal from the 4B/10B conversion circuit 7 and outputting a signal from the bus reset identification code generation circuit 8 for several clocks interval after a bus reset signal is detected by the bus reset detection circuit 6.

The selector C4 has a function of switching back and forth between a main signal and a control signal.

The parallel/serial conversion circuit 5 has a function of converting a parallel signal of 10 bits into a serial signal.

The serial/parallel conversion circuit 10 has a function of converting a serial signal from the transmission path into a parallel signal.

The block code boundary detection circuit 12 has functions of detecting a boundary of a block code (for example, a code of 10 bits) and outputting a parallel signal in a block unit from a boundary to another boundary after the detection of a boundary.

The 10B/8B conversion circuit 14 has a function of converting a block code of 10 bits which is a main signal into a code of 8 bits.

The 10B/4B conversion circuit 13 has a function of converting a block code of 10 bits which is a control signal into a code of 4 bits.

The bus reset identification code detection circuit 11 has functions of detecting a bus reset identification code, setting a train bit, and furthermore, outputting a signal for the purpose of switching the selector D.

The descrambler 15 has a function of converting a code randomized on the transmitting side into the original code which is not randomized.

The bus reset signal generation circuit 16 has a function of generating a bus reset signal (0101) as a control signal.

The selector D has a function of switching back and forth between an output of a descrambler and an output of the bus reset signal generation circuit.

Figure 2:
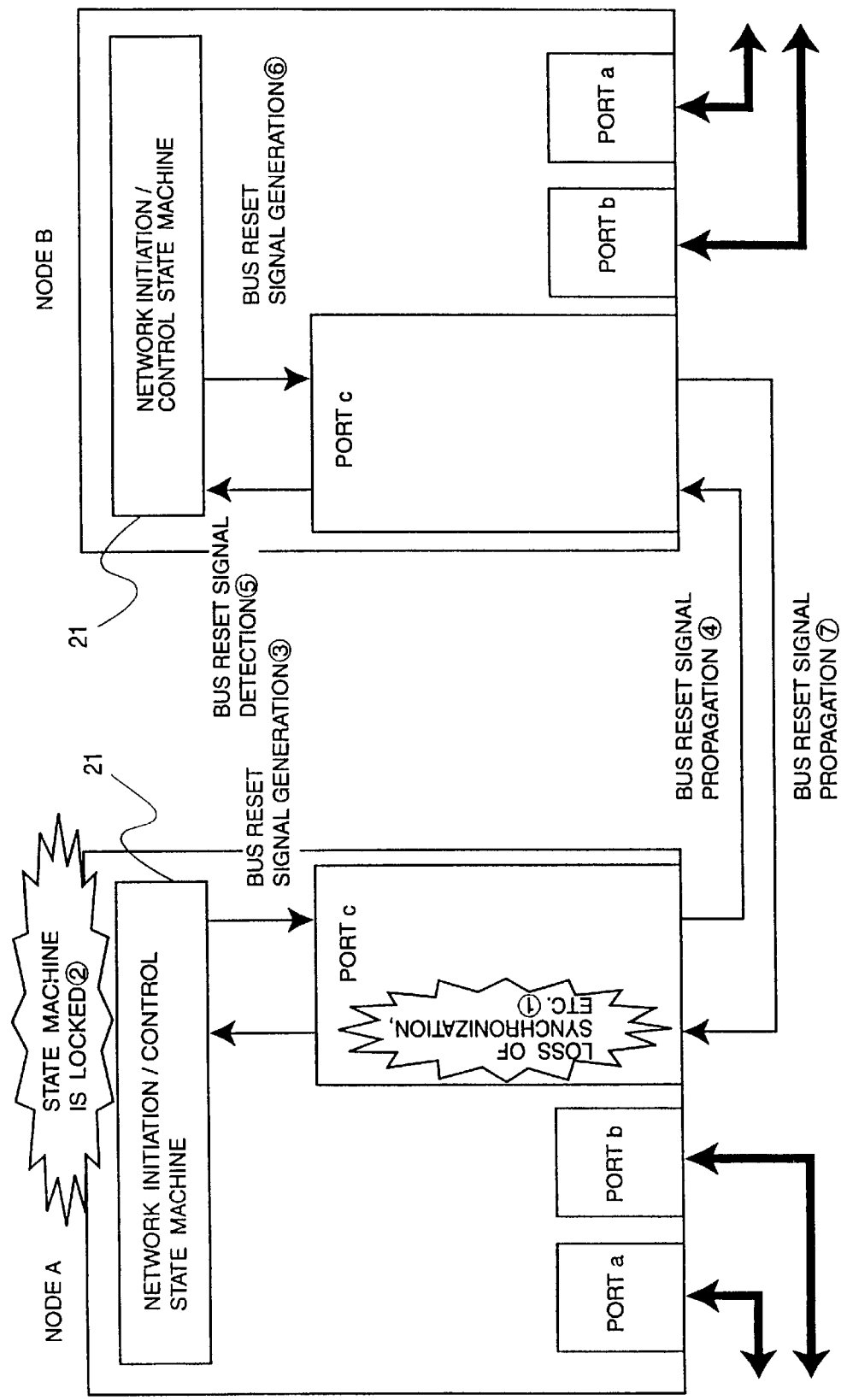
FIG. 2 is a block diagram showing operations of nodes having encoding circuits of the present invention.

Suppose a constitution that two nodes, the node A and the node B as shown in FIG. 2, are connected by a serial port. The port C has a transmitting/a receiving block shown in FIG. 1. During the usual operation, due to the noises and the like, an error of a boundary in the block code boundary detection circuit 12 within the receiving block 19 or loss of synchronization of the descrambler 15 (for example, the node A(①) of FIG. 2) is generated. In this case, since a main signal and a control signal outputted from the descrambler are different from signals which are expected, they are not processed by the network initiation/control state machine 21 of an upper layer. Specifically, the network initiation/control state machine 21 stops operation and becomes in a state of being locked(②). In the case where the locked state of the network initiation/control state machine 21 is continued more than a certain period of time (according to the IEEE 1394-1995, MAX_ARB_STATE_TIME=166.8us), the network initiation/control state machine 21 outputs a bus reset signal (0101) as a control signal for performing the initiation of the network(③)).

In the node A, the bus reset detection circuit 6 which has detected a bus reset signal outputted from the network initiation/control state machine 21 outputs a signal for several clocks interval (for example, 6 clocks interval) for the purpose of switching an output of the selector B9 from an output of the 4B/10B conversion circuit 7 to an output of the bus reset identification code generation circuit.

The bus reset identification code generation circuit 8 generates and outputs a block code which is not used in a control signal and a main signal (for example, a code of 20 bits which alternately transmits two codes of K28.5+= 0011111010 and K28.5−=1100000101). A bus reset identification code is serialized and outputted from the serial port without being randomized by the scrambler.

Figure 3:
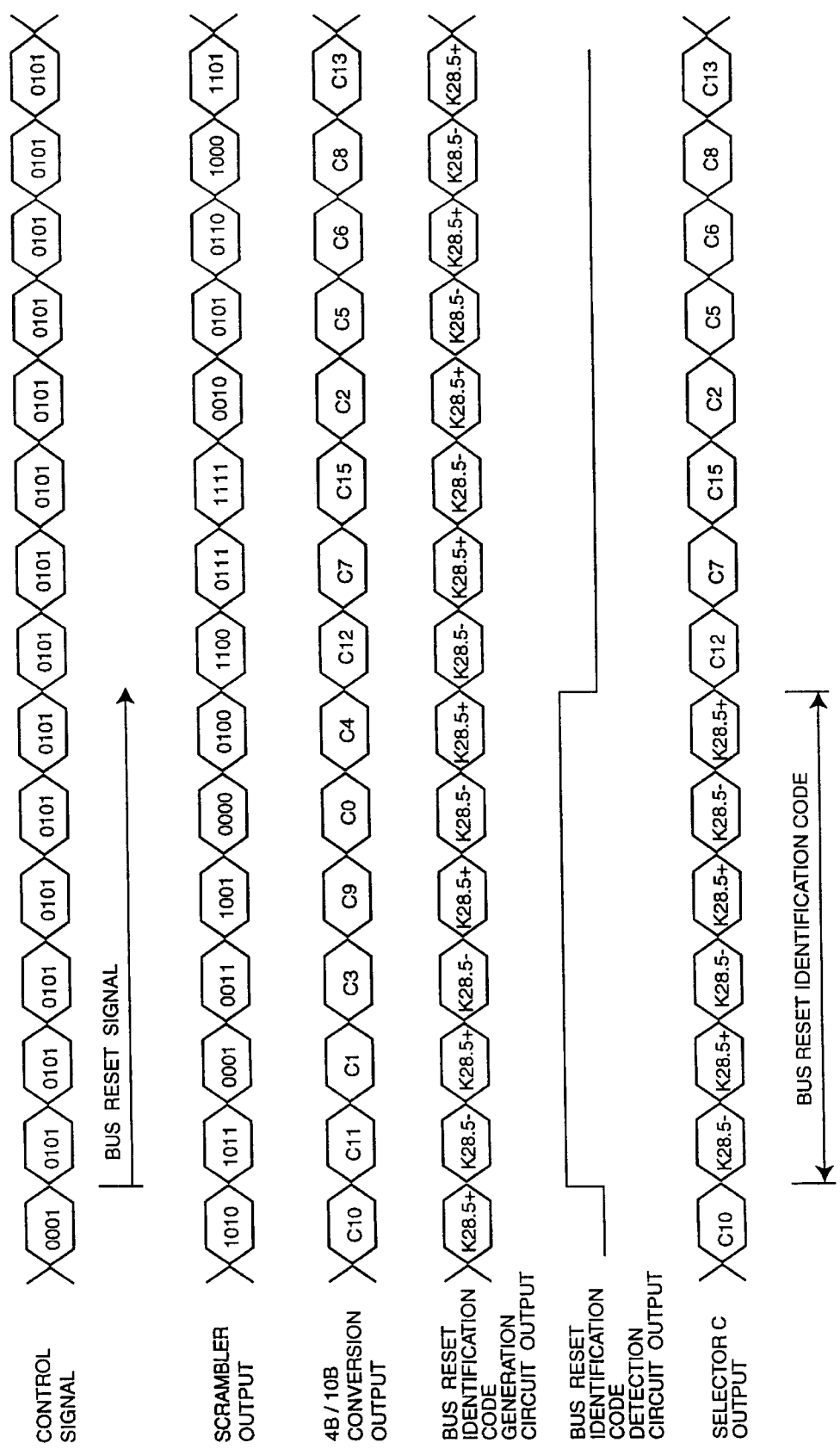
FIG. 3 is a diagram showing examples of outputs of each functional block of the transmitting block.

An appearance of a signal in each interface of the transmitting block is shown in FIG. 3. In the case of a bus reset being generated, a bus reset signal (0101) is inputted as a control signal. Since a bus reset signal is randomized, a scrambler output and a 4B/10B conversion output do not have any regularities. When a control signal is changed into a bus reset signal, a bus reset detection circuit output is changed from "L" to "H", and after a certain period of time (for example, 6 clocks interval), changed from "H" to "L" again. A bus reset identification code is outputted from the selector C only for a certain period of time (for example, 6 clocks interval). A bus reset signal from the node A is inputted into the node B by way of the transmission path(④).

In the receiving block 19 of the node B, a received serial signal is converted into a parallel signal by the serial/parallel conversion circuit 10, the detection of the coincidence with a bus reset identification code is performed by the block code boundary detection circuit 12, and a boundary of a block code is recognized again. Moreover, by the bus reset identification code detection circuit 11, a bus reset identification code is detected, and concurrently with a setting a train bit of the descrambler, an output of the selector D17 is switched from an output of the descrambler 15 to an output of the bus reset signal generation circuit 16.

The descrambler 15 identifies an output of itself, in the case where a bus reset signal in series (0101) are detected, resets a train bit, and switches an output of the selector D from an output of the bus reset signal generation circuit 16 to an output of the descrambler 15.

Figure 4:
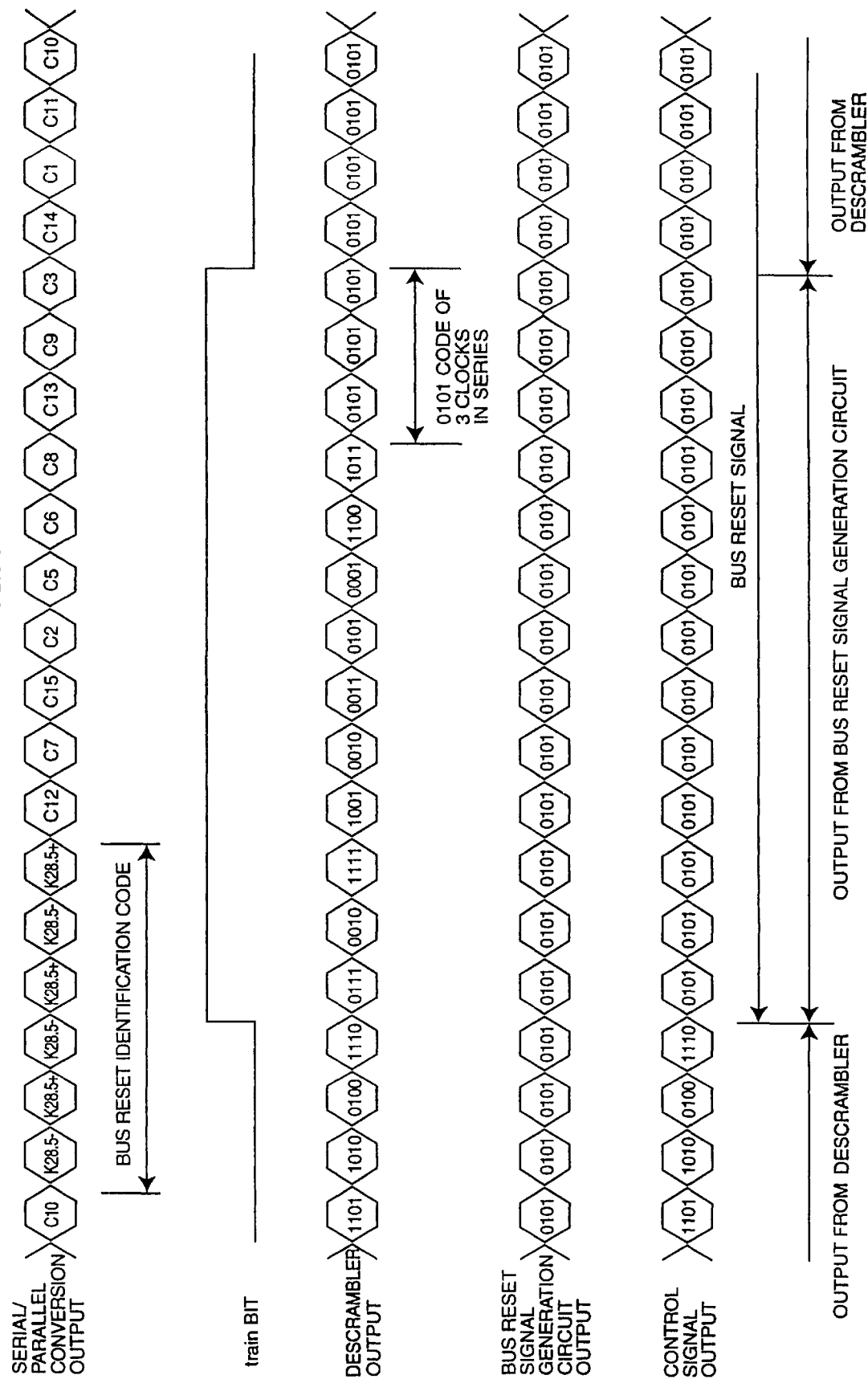
FIG. 4 is a diagram showing examples of outputs of each functional block of the receiving block.

An appearance of a signal in each interface of the receiving block is shown in FIG. 4. When a bus reset identification code (for example, a code of 20 bits of K28.5+ or K28.5−) is detected in a serial/parallel conversion output, a bus reset signal (0101) is outputted as a control signal output by switching an output of the selector D to the side of the bus reset signal generation circuit concurrently with a train bit being changed from "LB" to "H". When the value of a descrambler output is locked (for example, 3 clocks in series) by a bus reset signal (0101), an output of the selector D is switched to the side of the descrambler as well as a train bit is changed from "H" to "L".

The network initiation/control state machine 21 of the node B detects a bus reset signal from the node A (⑤) and transmits a bus reset signal for the purpose of starting the initiation of the network (⑥). A serial bus reset signal to which a bus reset identification code is added is outputted from the transmitting block of the node B by the operation similar to that of the transmitting block of the node A and inputted into the node A by way of the transmission path (⑦).

The receiving block of the node A which receives a bus reset signal from the node B performs the re-detection of a block code boundary and the re-establishment of the synchronization between a scrambler and a descrambler and completes the initiation of the port during the bus resetting.

Next, the second embodiment of the present invention will be described below with reference to the drawings.

Figure 5:
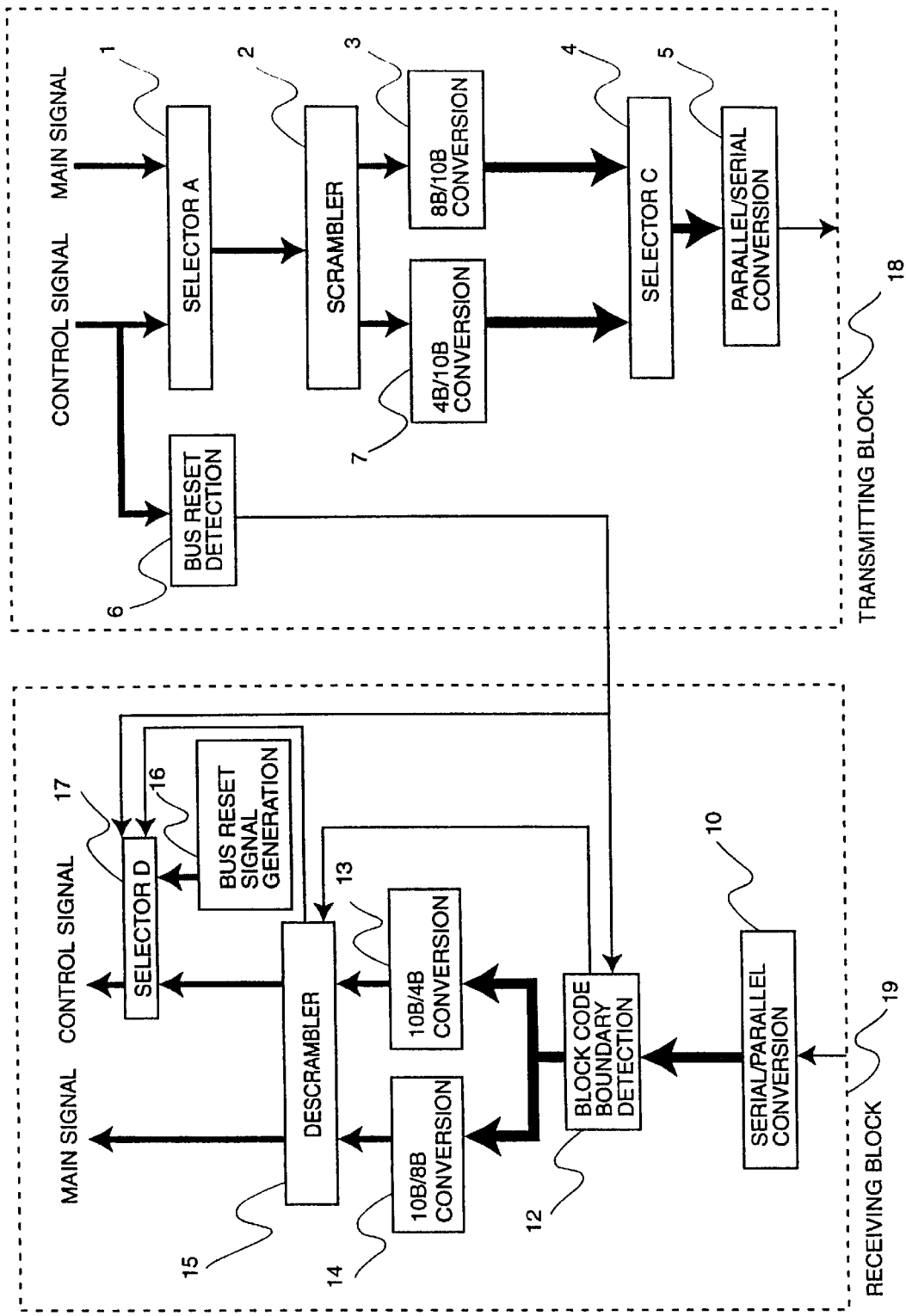
FIG. 5 is a block diagram showing an encoding circuit of the second embodiment of the present invention.
Figure 6:
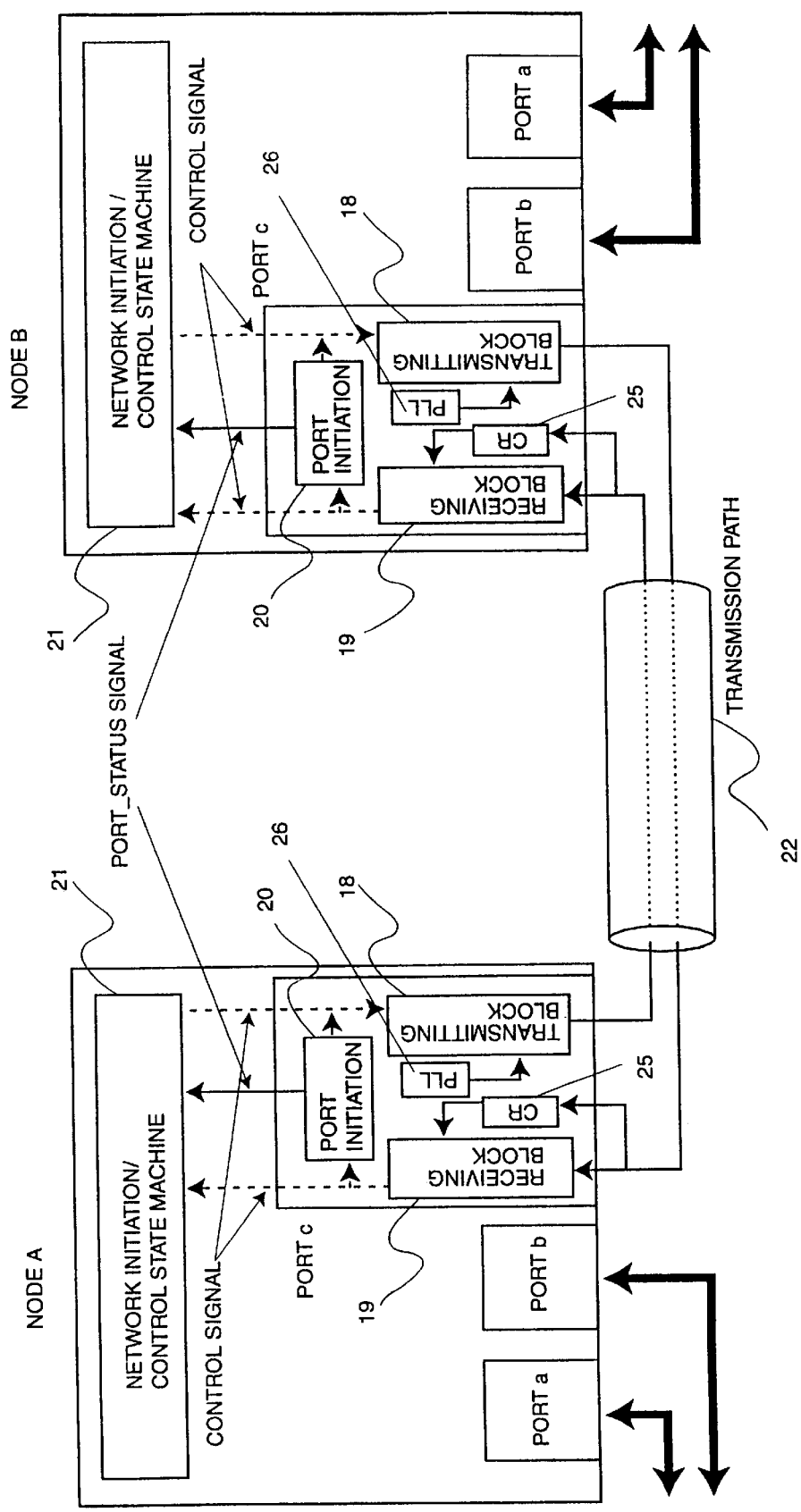
FIG. 6 is a diagram showing a basic constitution and its connecting configuration of nodes.
Figure 7:
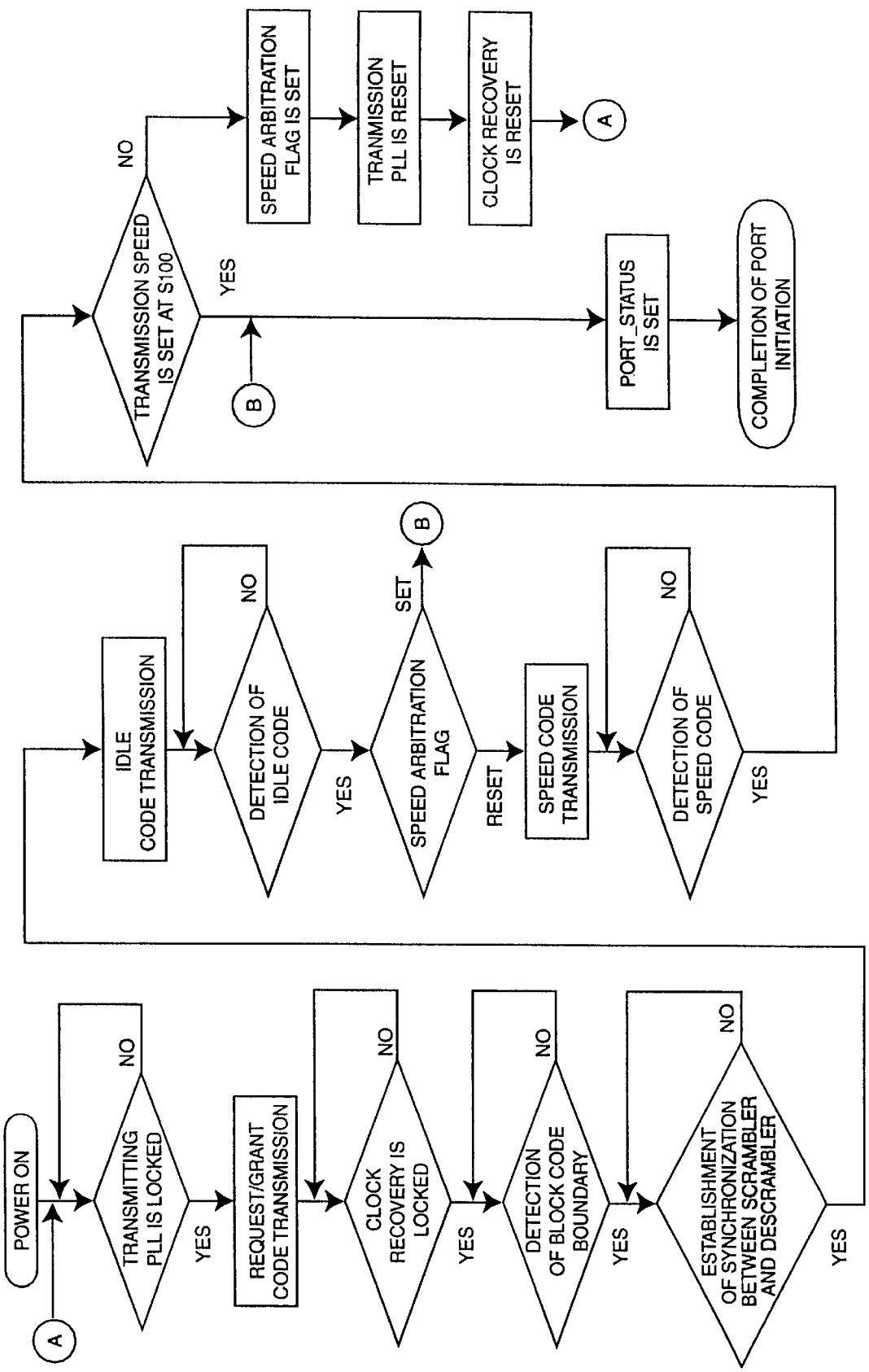
FIG. 7 is a flowchart showing the procedure of the initiation of the serial port.
Figure 9:
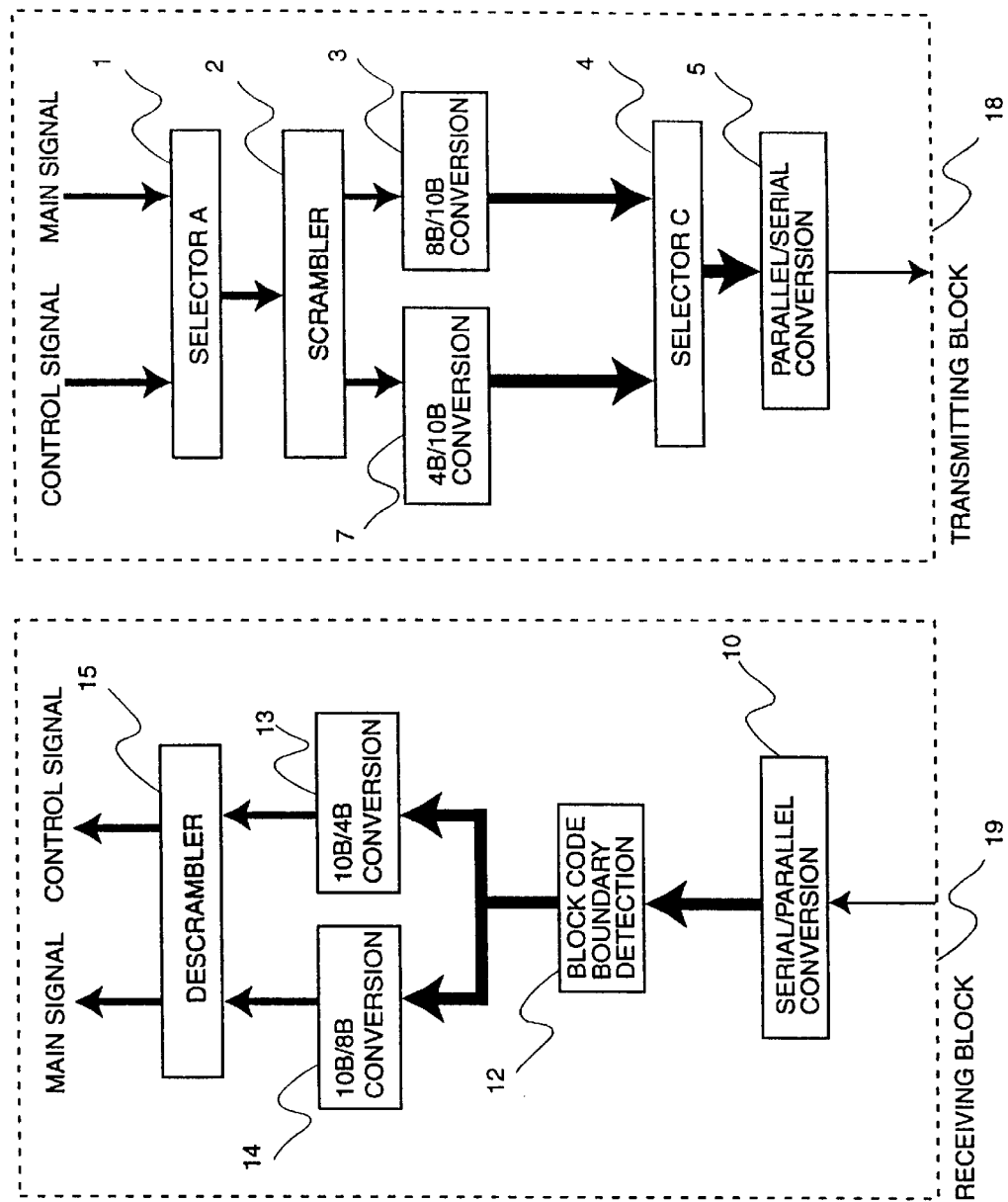
FIG. 9 is a block diagram showing a conventional transmitting/receiving section of a serial port.
Figure 11:
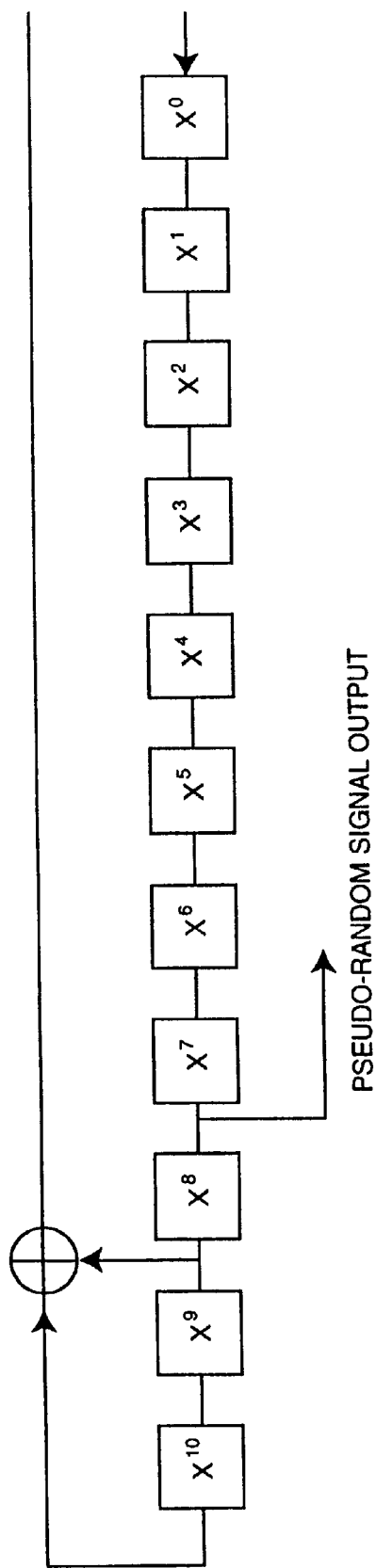
FIG. 11 is a diagram showing a constitution of a shift register which is used in the scrambler and the descrambler.
Figure 13:
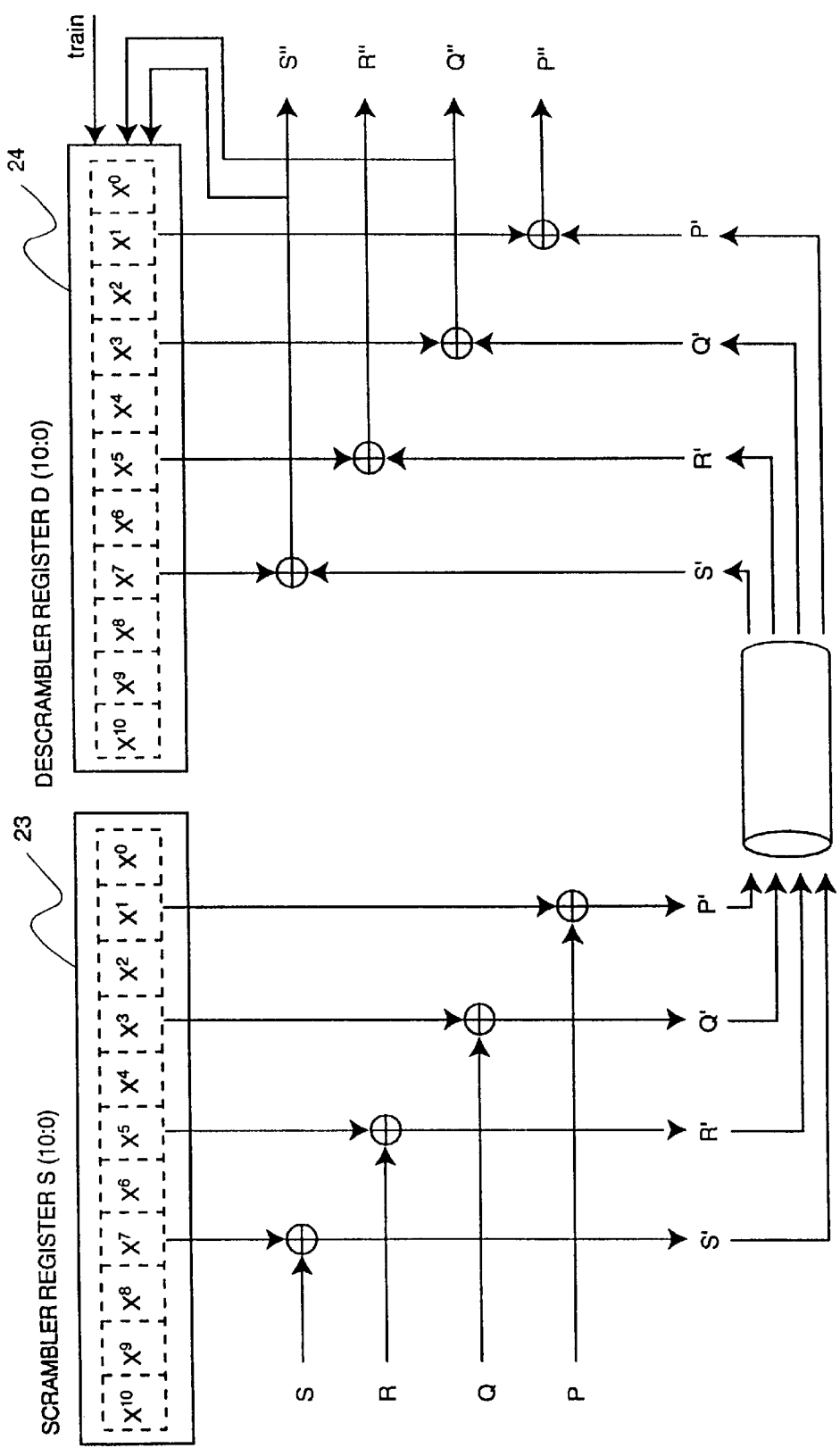
FIG. 13 is a diagram showing the relation between a scrambler and a descrambler.

FIG. 5 is a block diagram showing an encoding circuit of the second embodiment of the present invention.

In FIG. 5, an encoding circuit is broadly divided into two (2) sections of the transmitting block 18 and the receiving block 19. The transmitting block 18 is composed of the selector A1, the scrambler 2, the 8B/10B conversion circuit 3, the 4B/10B conversion circuit 7, the selector C4 and the parallel/serial conversion circuit 5. The receiving block 19 is composed of the serial/paallel conversion circuit 10, the block code boundary detection circuit 12, the 10B/8B conversion circuit 14, the 10B/4B conversion circuit 13, the descrambler 15, the bus reset signal generation circuit 16 and the selector D17.

The selector A1 has a function of switching back and forth between a control signal and a main signal for the purpose of using the common scrambler by a control signal and a main signal.

The scrambler 2 has a function of randomizing a data sequence of control signals or main signals.

The 8B/10B conversion circuit 3 has a function of converting a main signal of 8 bits into a code of 10 bits.

The 4B/10B conversion circuit 7 has a function of converting a control signal of 4 bits into a code of 10 bits.

The bus reset detection circuit 6 has functions of detecting a bus reset signal in a control signal and outputting a trigger signal performing the re-detection of a block code boundary, and furthermore, outputting a signal for the purpose of switching the selector D9.

The selector C4 has a function of switching back and forth between a main signal and a control signal.

The parallel/serial conversion circuit 5 has a function of converting a parallel signal of 10 bits into a serial signal.

The serial/parallel conversion circuit 10 has a function of converting a serial signal from the transmission path into a parallel signal.

The block code boundary detection circuit 12 has functions of detecting a boundary of a block code (for example, a code of 10 bits) and outputting parallel signals in a block unit from a boundary to another boundary after the detection of a boundary, and furthermore, setting a train bit after the detection of a block code boundary.

The 10B/8B conversion circuit 14 has a function of converting a block code of 10 bits which is a main signal into a code of 8 bits.

The 10B/4B conversion circuit 13 has a function of converting a block code of 10 bits which is a control signal into a code of 4 bits.

The descrambler 15 has a function of converting a code randomized on the transmitting side into the original code which is not randomized.

The bus reset signal generation circuit 16 has a function of generating a bus reset signal (0101) as a control code.

The selector D has a function of switching back and forth between an output of the descrambler and an output of the bus reset signal generation circuit.

In the first embodiment of the present invention described above, a method that a first several clocks interval of a bus reset signal is replaced by a special code and transmitted so that the bus reset signal can be detected on the receiving side and the detection of a boundary of a block code and the re-establishment of the synchronization between a scrambler and a descrambler are performed by detecting this special code on the receiving side of the opposed node is employed. However, in the case where a bus reset signal was detected on the transmitting side, the problem of the prior art can be solved as well by the means that a trigger signal performing the re-detection of a block code boundary is outputted to the receiving side within the same node and a trigger signal performing the re-establishment of the synchronization between a scrambler and a descrambler is outputted after the re-detection of a block code boundary.

Suppose a case that two (2) nodes of the node A and the node B having an encoding circuit of FIG. 5 are connected each other as in FIG. 2. In the node A, the bus reset detection circuit 6 which has detected a bus reset signal from the network initiation/control state machine 21 outputs a trigger signal for the purpose of starting the re-detection of a block code boundary and outputs a signal for the purpose of switching an output of the selector D17 to an output of the bus reset signal generation circuit 16.

Moreover, a bus reset signal from the network initiation/control state machine 21 is randomized by the scrambler 2, and after this signal is block-encoded by the 4B/10B conversion circuit 7, this signal is converted into a serial signal and transmitted as a serial signal.

The node B which has received this serial signal detects a bus reset signal and the network initiation/control state machine of the node B outputs a bus reset signal as a control signal. This bus reset signal is transmitted to the node A and converted into a parallel signal by the serial/parallel conversion circuit.

In the block code boundary detection circuit 12 of the node A, the detection of a boundary is conventionally performed by detecting the coincidence with a control code C4 (=0010001111) or C11 (=1101110000).

The block code boundary detection circuit 12 sets a train bit for the purpose of performing the re-establishment of the synchronization between a scrambler and a descrambler after the completion of the detection of a boundary.

In the case where a stable (locked) bus reset code (for example, 3 clocks in series) from the descrambler 15 is obtained, a train bit is reset, an output of the selector D17 is switched to an output of the descrambler.

According to an encoding circuit of the present invention described above in detail, even in the case where an error of a boundary of a block code and loss of the synchronization between a scrambler and a descrambler are generated after the initiation of the port due to the noises and the like, the initiation of the port, specifically, the re-detection of a block code boundary and the re-establishment of the synchronization between a scrambler and a descrambler concurrently with the initiation of the network can be performed.

The entire disclosure of Japanese Patent Application No. 9-339036 filed on Dec. 9, 1997 including specification, claims, drawings and summary are incorporated herein by reference in its entirety.

What is claimed is:

1. An encoding circuit comprising:
    a transmitting block; and
    a receiving block,
    said transmitting block comprising:
        a scrambler randomizing a data sequence of a control signal from an upper layer and a data sequence of a main signal from an upper layer;
        a block encoding circuit block-encoding a control signal and a main signal respectively randomized by said scrambler;

a parallel/serial conversion circuit converting a parallel signal outputted from said block encoding circuit into a serial signal;

a bus reset identification code generation circuit generating a bus reset identification code, said bus reset identification code replacing a first interval, which includes several clocks, of a bus reset signal, said bus reset signal being included in a control signal from an upper layer and performing initiation of a network; and a bus reset detection circuit detecting said bus reset signal and providing said bus reset identification code as input into said parallel/serial conversion circuit;

said receiving block comprising:

a serial/parallel conversion circuit converting a serial signal from a transmission path into a parallel signal;

a block code boundary detection circuit detecting a code boundary of a block code from a parallel signal outputted from said serial/parallel conversion circuit and outputting a parallel signal in a block code unit;

a block encoding inverse conversion circuit inversely converting a code of a control signal and a code of a main signal, respectively, which are block-encoded on a transmitting side;

a descrambler restoring a data sequence which is randomized;

a bus reset identification code detection circuit detecting said bus reset identification code and generating a trigger signal for starting a re-establishment of a synchronization between said scrambler and said descrambler;

a bus reset signal generation circuit generating a pseudo bus reset signal for being outputted to an upper layer while an establishment of a synchronization between said scrambler and said descrambler is performed; and a selector switching back and forth between an output of said descrambler and an output of said bus reset signal generation circuit.

2. An encoding circuit as claimed in claim 1, wherein said bus reset identification code uses a code which is not used in said control signal and said main signal.

3. An encoding circuit as claimed in claim 1, wherein said transmitting block further comprises a selector switching back and forth between an output of said block encoding circuit and said bus reset identification code.

4. An encoding circuit comprising:

a transmitting block; and a receiving block, said transmitting block comprising:

a scrambler randomizing a data sequence of a control signal from an upper layer and a data sequence of a main signal from an upper layer;

a first selector which receives a data sequence of said control signal and a data sequence of said main signal as inputs, and outputs one of a data sequence of said control signal and a data sequence of said main signal;

a first converting means for converting a main signal into a code of predetermined numeric bits;

a second converting means for converting a control signal into a code of predetermined numeric bits;

a bus reset detection circuit detecting a bus reset, said bus reset signal being included in a control signal from an upper signal and performing initiation of a network, and outputting a bus reset detection signal;

a bus reset identification code generation circuit generating a bus reset identification code for replacing a first interval, which includes several clocks, of said bus reset signal with a code which is not used in said control signal and said main signal;

a second selector which receives an output of said second converting means and said bus reset identification code as inputs, and outputs a bus reset identification code for said first several clocks interval when said bus reset detection signal is received;

a third selector switching back and forth between an output of said first converting means and an output of said second selector and outputting an output of said first converting means and an output of said second selector; and a parallel/serial conversion circuit converting a parallel signal outputted from said third selector into a serial signal;

said receiving block comprising:

a serial/parallel conversion circuit converting a serial signal from a transmission path into a parallel signal;

a bus reset identification code detection circuit detecting said bus reset identification code from an output of said serial/parallel conversion circuit and generating a trigger signal for starting a re-establishment of a synchronization between a scrambler and a descrambler;

a block code boundary detection circuit detecting a code boundary of a block code from a parallel signal from said serial/parallel conversion circuit and outputting a parallel signal in a block code unit;

a first inverse converting means for inversely converting a code of a control signal outputted from said block code boundary detection circuit;

a second inverse converting means for inversely converting a code of a main signal outputted from said block code boundary detection circuit;

a descrambler performing a re-establishment of a synchronization using said trigger signal and restoring a randomized data sequence outputted from said first inverse converting means and said second inverse converting means;

a bus reset signal generation circuit generating a pseudo bus reset signal for being outputted to an upper layer while a re-establishment of a synchronization between said scrambler and said descrambler is performed; and a selector switching an output of said descrambler and an output of said bus reset signal generation circuit by using a trigger signal of said bus reset identification code detection circuit.

5. An encoding circuit comprising:

a transmitting block; and a receiving block, said transmitting block comprising:

a scrambler randomizing a data sequence of a control signal from an upper layer and a data sequence of a main signal from an upper layer;

a block encoding circuit block-encoding a control signal and a main signal, respectively, which are randomized by said scrambler;

a parallel/serial conversion circuit converting a parallel signal outputted from said block encoding circuit into a serial signal; and a bus reset detection circuit detecting a bus reset signal in a control signal and generating a trigger signal for starting a re-detection of a boundary of a block code;

said receiving block comprising:
  a serial/parallel conversion circuit converting a serial signal from a transmission path into a parallel signal;
  a block code boundary detection circuit receiving a trigger signal from said bus reset detection circuit, starting a re-detection of a boundary of a block code and generating a trigger signal for starting a re-establishment of a synchronization between a scrambler and a descrambler;
  a block code inverse conversion circuit inversely converting a code of a control signal and a code of a main signal which are block-encoded on a transmitting side;
  a descrambler receiving a trigger signal from said block code boundary detection circuit, starting a re-establishment of a synchronization between a scrambler and a descrambler and generating a switching signal for switching a control signal for being outputted to an upper layer when a bus reset signal was detected in an output;
  a bus reset signal generation circuit generating a pseudo bus reset signal for being outputted to an upper layer; and
  a selector switching back and forth between an output of said descrambler and an output of said bus reset signal generating circuit.

6. An encoding circuit comprising:
a transmitting block; and
a receiving block,
said transmitting block comprising:
  a scrambler randomizing a data sequence of a control signal from an upper layer and a data sequence of a main signal from an upper layer;
  a first selector which receives a data sequence of said control signal and a data sequence of said main signal as inputs, and outputs one of a data sequence of said control signal and a data sequence of said main signal to said scrambler;
  a first converting means for converting a main signal into a code of predetermined numeric bits;
  a second converting means for converting a control signal into a code of predetermined numeric bits;
  a bus reset detection circuit detecting a bus reset signal in said control signal and generating a trigger signal for starting a re-detection of a boundary of a block code;
  a second selector switching back and forth between an output of said first converting means and an output of said second converting means, and outputting an output of said first converting means and an output of said second converting means; and
  a parallel/serial conversion circuit converting a parallel signal outputted from said second selector into a serial signal;
said receiving block comprising:
  a serial/parallel conversion circuit converting a serial signal from a transmission path into a parallel signal;
  a block code boundary detection circuit receiving a trigger signal from said bus reset detection circuit, starting a re-detection of a boundary of a block code and generating a trigger signal for starting a re-establishment of a synchronization between a scrambler and a descrambler after the detection of a boundary of a block code;
  a first inverse converting means for inversely converting a code of a control signal from said block code boundary detection circuit;
  a second inverse converting means for inversely converting a code of a main signal from said block code boundary detection circuit;
  a descrambler receiving a trigger signal from said block code boundary detection circuit, starting a re-establishment of a synchronization between a scrambler and a descrambler and generating a switching signal for switching a control signal for being outputted to an upper layer when a bus reset signal is detected in an output;
  a bus reset generation circuit generating a pseudo bus reset signal for being outputted to an upper layer; and
  a selector switching back and forth between an output from said descrambler and an output from said bus reset signal generation circuit.

7. A method of detecting a block code boundary and establishing a synchronization between a scrambler and a descrambler, said method comprising steps of:
  detecting a bus reset signal, said bus reset signal performing an initiation of a network, from a control signal outputted from a network initiation/control state machine;
  acknowledging a detection of said bus reset signal, by using a signal which is not randomized, to a receiving side; and
  performing a re-detection of a block code boundary and a re-establishment of a synchronization between a scrambler and a descrambler when said acknowledgment is recognized on a receiving side.

8. A method of detecting a block code boundary and establishing a synchronization between a scrambler and a descrambler, said method comprising steps of:
  detecting a bus reset signal, said bus reset signal performing an initiation of a network, from a control signal outputted from a network initiation/control state machine;
  replacing a code of a first interval, which includes several clocks, of said bus reset signal by a code which is not used in said control signal and said main signal, and generating a bus reset identification code;
  detecting said bus reset identification code and setting a train bit of a descrambler;
  performing a re-detection of a block code boundary by using said bus reset identification code; and
  outputting a pseudo bus reset signal to a network initiation/control state machine while a re-establishment of a synchronization of said descrambler is performed.

9. A method of detecting a block code boundary and establishing a synchronization between a scrambler and a descrambler, said method comprising steps of:
  detecting a bus reset signal, said bus reset signal performing an initiation of a network, from a control signal outputted from a network initiation/control state machine and generating a trigger signal for performing a re-detection of a block code boundary;
  performing a re-detection of a block code boundary by using said trigger signal;
  setting a train bit of a descrambler after a re-detection of a block code boundary; and
  outputting a pseudo bus reset signal to a network initiation/control state machine during a re-detection of said block code boundary and a re-establishment of a synchronization of said descrambler.

* * * * *